Patented June 18, 1929.

1,717,685

UNITED STATES PATENT OFFICE.

HERMAN HEUSER, OF EVANSTON, ILLINOIS, ASSIGNOR TO UNITED STATES PROCESS CORPORATION, OF CHICAGO, ILLINOIS, A CORPORATION OF ILLINOIS.

MANUFACTURE OF BEVERAGES.

No Drawing.   Application filed April 8, 1927. Serial No. 182,182.

My invention relates to the manufacture of beverages containing a permissible percentage of alcohol and possessing the taste and flavor of fermented alcoholic beverages, such as, for example, cereal beverages or beverages of the type of wine, the object of my invention being to increase the taste and flavor characteristics of these beverages.

In practical operation it is customary to produce a beverage having an alcohol content within the legal limit, by mixing a dealcoholized beverage with the original beverage. But I find that it is practically impossible to change, for example, dealcoholized beer into a good marketable cereal beverage by mixing it with beer at a rate that leaves the alcohol percentage of the dealcoholized beer within the permissible limit. The beer is not strong enough in taste and flavor to impart enough beer charactertistics to the dealcoholized beer so deficient in these characteristics, when it is added to the dealcoholized beer at a rate that leaves the alcohol content of the mixture within the permissible limit.

However, I have discovered that, when the beer is condensed (i. e., concentrated) and thereupon subjected to a yeast fermentation, its addition in this form to the dealcoholized beer will change the same into a beverage that is well fitted for marketing because of its pronounced beery taste and flavor. The reason for this very surprising improvement, I find, lies in the exceptionally strong beery taste and flavor of the fermented condensed beer, which as such possesses a very much greater taste- and flavor-imparting quality than the original beer.

Further I have discovered that this surprisingly strong taste- and flavor-imparting quality of the fermented condensed beer, so very much superior to that of the original beer, is due to the exceptionally great ester-producing effect of the fermenting yeast upon the exceptionally large content of amino-acids in the condensed beer, the amino-acids having been produced during the condensing of the beer by the hydrolyzing action of the more concentrated fixed acid content upon the more concentrated protein content of the condensed beer. The ester-producing action of the fermenting yeast increases with the degree of concentration of the beer.

Further, I have discovered that, when I augment the hydrolyzing action of the many times more concentrated beer acids upon the many times more concentrated protein content of the condensed beer by the hydrolyzing action of the proteolytic enzymes, the ester-producing effect of the yeast increases still more. Thus, I have augmented the protein hydrolyzing action of the acids of the beer by the hydrolyzing action of suitable proteolytic enzymes, during the concentration of the beer or thereafter at temperatures suitable to the particular enzyme employed. Suitable enzymes, employed in quantities from 0.010 to 0.090 gram per 1000 cubic centimeters of condensed beer, are those having amides and amino-acids among their final products, such as the endotryptase of the yeast, which works very effectively in the condensed beer at temperatures up to 56° C., and trypsin which is very effective below 38° C. in organic acid containing media as represented by beer or condensed beer; and cereal proteases, such as the peptase of malt, may be employed very successfully in augmenting the hydrolyzing action of the beer acids, or what is the same, the ester-producing property of the yeast. I have also employed pepsin, papain and bromelin, which enzymes, hydrolyzing the protein to a more limited extent, assist the hydrolyzing action of the acid upon the protein of the condensed beer with good results.

Without intending to limit the invention to the particular steps set forth, I will describe a process suitable to carry out my invention in the manufacture of a beverage of the beer type containing a permissible percentage of alcohol and illustrating the step of condensing the beer in its simplest form with acids alone.

Beer, containing 5% of extract, 3.50% of alcohol by volume, 0.45% of protein and 0.06% of fixed acids consisting of lactic acid, phosphoric acid, succinic acid, etc., is used for processing. If the percentage of acid in the original beer be abnormally small, the same may be increased by the addition of a suitable acid, preferably an organic acid conforming to the character of the beverage. One portion of the beer is dealcoholized. The dealcoholized beer is cooled to a low temperature, say, 3° C. The cooled beer contained now 0.10% of alcohol, its extract content being 5%, preferably receives an addition of a phosphite reducing agent such as 0.09 gram of sodium hypophosphite per 1000 cubic centimeters of beverage in accordance with my United States Patent No. 1,550,359, while it is being stirred to dissolve and to disperse the phosphite in the dealcoholized beer. The dealcoholized beer may, if desired, be carbonated.

Another portion of the beer is condensed to any desired concentration. In the present instance, the condensation is continued until the extract in the condensed beer is 25%. While the concentration of the beer may be effected at any suitable temperature, I prefer to do so at the very high temperature of 100° C., in order to make most effective the hydrolyzing action of the fixed beer acids, which continually increase in concentration, during the condensing of the beer, from the original percentage of 0.06% to the final percentage of 0.30%, the protein content of the beer having increased during the condensing from 0.45% to 2.25%.

After the concentrated beer has been cooled to a suitably low temperature of, say, 10° C., it receives an addition of fermentable substances of any suitable kind, as, for example, an addition of cane sugar at the rate of 50 grams per 1000 cubic centimeters of condensed beer and in addition yeast, as, for example, thick-fluid pitching yeast, is added to the condensed beer, the amount of yeast being 7½ grams per 1000 cubic centimeters. The condensed beer is stirred, until the cane sugar has been dissolved. Thereupon it is left to ferment.

If desired, a suitable quantity of a proteolytic enzyme may be added during or after concentration.

After the fermentation has been completed, the condensed beer contains 3.50% of alcohol by volume and 24.40% of extract. The condensed beer is now cooled to a low temperature of, say 3° C., and thereupon it is mixed in such proportion with the dealcoholized beer containing 0.10% of alcohol by volume as will leave the alcohol percentage of the dealcoholized beer within the permissible legal limit.

In the present instance, it is intended that the alcohol percentage of the final beverage be 0.46% by volume. In mixing the dealcoholized beer and the fermented condensed beer, I use the following formula:

$$X = \frac{100 \times (D-L)}{P-D}$$

in which

X is the quantity of fermented condensed beer to be added to 100 barrels of dealcoholized beer.

D is 0.46%, the desired percentage of alcohol in the dealcoholized beer.

L is 0.10%, the percentage of alcohol contained already in the dealcoholized beer.

P is 3.50%, the percentage of alcohol produced in the fermented condensed beer.

The amount of the fermented condensed beer to be added to 100 barrels of dealcoholized beer, therefore, is as follows:

$$X = \frac{100 \times (0.46 - 0.10)}{3.50 - 0.46} = 11.84$$

Thus, with the addition of 11.84 barrels of fermented condensed beer containing 3.50% of alcohol by volume to 100 barrels of dealcoholized beer, containing 0.10% of alcohol by volume, the alcohol percentage in the final beverage is 0.46% by volume.

The beverage thus produced, if not sufficiently effervescent, is carbonated, and, before it is put in the trade packages, it is also filtered. As stated, it possesses an alcohol content of 0.46% by volume, its extract content being 7.05%. It is distinguished by a beery taste and flavor exceptionally strong and pleasing.

The present invention of adding a fermented condensed beverage to a beverage of the same type represents an improvement in the production of all kinds of cereal beverages with a permissible alcohol content, as, for example, to beverages of this kind made by check fermentation or by a limited afterfermentation, and it is also applicable to the production of all kinds of wine beverages with a permissible percentage of alcohol made from grapes or any other fruits, such as apples, pears, raspberries, strawberries, plums, peaches, etc.

I claim as my invention:

1. In the manufacture of a beverage possessing the taste and flavor of a fermented alcoholic beverage and having an alcohol content within the permissible limit, the process which consists in adding a yeast-fermented condensed beverage to a beverage of the same type, which has an alcoholic content below the permissible limit, in such proportion that the resultant beverage possesses an alcohol content within the permissible limit.

2. In the production of the yeast-fermented condensed beverage of claim 1, the step of adding a proteolytic enzyme to said beverage.

3. In the production of the yeast-fermented condensed beverage of claim 1, the step of converting protein into amino bodies by the hydrolyzing action of acids.

4. In the production of the yeast-fermented condensed beverage of claim 1, the step of converting protein into amino bodies by the hydrolyzing action of acids augmented by the hydrolyzing action of proteolytic enzymes.

5. In the manufacture of a beverage of the beer type possessing an alcohol content within the permissible limit, the process which consists in making beer, dealcoholizing a portion thereof, condensing another portion thereof, subjecting the condensed portion to the effects of yeast fermentation and adding the fermented condensed portion to the dealcoholized portion in such proportions that the resultant beverage possesses an alcohol content within the permissible limit.

In testimony whereof, I have hereunto affixed my signature.

HERMAN HEUSER.